United States Patent [19]
Jones et al.

[11] Patent Number: 5,503,317
[45] Date of Patent: Apr. 2, 1996

[54] APPARATUS FOR FRACTURING CONNECTING RODS PREFORMS

[75] Inventors: Joel W. Jones, Windsor; David R. Prince, Kingsville, both of Canada

[73] Assignee: Tri-Way Machine Ltd., Ontario, Canada

[21] Appl. No.: 220,490

[22] Filed: Mar. 31, 1994

[51] Int. Cl.⁶ ..................................................... B26F 3/00
[52] U.S. Cl. ............................ 225/103; 225/96; 225/100
[58] Field of Search ................................. 225/2, 93, 96.5, 225/100, 101, 103

[56] References Cited

U.S. PATENT DOCUMENTS

| | | | |
|---|---|---|---|
| 2,553,935 | 5/1951 | Parks et al. | 225/2 |
| 4,569,109 | 2/1986 | Fetouh . | |
| 4,754,906 | 7/1988 | Brovold | 225/103 |
| 4,768,694 | 9/1988 | Fabris et al. . | |
| 4,802,269 | 2/1989 | Mukai et al. | 225/2 |
| 4,993,134 | 2/1991 | Hoag et al. . | |
| 5,131,577 | 7/1992 | Hoag et al. | 225/96.5 |
| 5,169,046 | 12/1992 | Miessen et al. | 225/100 |
| 5,263,622 | 11/1993 | Henzler et al. | 225/100 |

Primary Examiner—Rinaldi I. Rada
Assistant Examiner—Charles Goodman
Attorney, Agent, or Firm—Shoemaker and Mattare, Ltd.

[57] ABSTRACT

Apparatus for fracturing, into a bearing cap and a connecting rod, an integral preform which defines a cylindrical aperture and two spaced-apart bolt seat shoulders includes a guide member that defines a first guideway along which moves a first slide member, the latter in turn defining a second guideway parallel to the first, along which a second slide member moves. A split mandrel has an upper part fixed with respect to the first slide member and a lower part fixed with respect to the guide member. The split mandrel halves define an internal tapered passageway for receiving a wedge capable of forcing the mandrel halves apart. Projections on the second slide member contact the bolt seat shoulders when the cylindrical aperture of the preform receives the split mandrel, and a camming member urges the second slide member toward the mandrel. When the wedge member enters the tapered passageway, forcing the mandrel parts apart and fracturing the preform, the bearing cap's contact with the projections and the upper part of the split mandrel securely holds the bearing cap in place. Further positional security is provided by static and dynamic locators which have a lateral pinching action on the bearing cap and on the connecting rod.

3 Claims, 4 Drawing Sheets

5,503,317

APPARATUS FOR FRACTURING CONNECTING RODS PREFORMS

This invention relates to the fracture separation, into a bearing cap and a connecting rod, of an integral preform, while ensuring that the separated pieces will be capable of re-unification, in a high production environment.

BACKGROUND OF THIS INVENTION

Numerous methods have been employed to separate connecting rod preforms by fracturing, both in laboratory and production environments. These include cryogenic cooling or electron beam exposure to era brittle the fracture area, fracturing by wedge actuation of an expanding mandrel, and linear opposing pulling forces to separate the bearing cap from the connecting rod preform. The following patents are representative of the prior art:

U.S. Pat. No. 4,569,109, issued on Feb. 11, 1986;
U.S. Pat. No. 4,768,694, issued on Sep. 6, 1988;
U.S. Pat. No. 4,993,134, issued on Feb. 19, 1991.

Despite these prior developments, certain elements vital to fracture separation continue to have the greatest influence on the quality of the finished connecting rod. Two of these elements are:

(a) achieving simultaneous fracture along the cracking plane of both legs of the connecting rod. Failure to achieve simultaneous fracture is likely to result in plastic deformation of the crank bore and inhibit re-mating of the two parts;

(b) maintaining positive control over the position of the separated bearing cap and connecting rod body, to ensure accurate micro-alignment during re-mating. Failure to do this may negate the inherent advantages of fracture separation.

GENERAL DESCRIPTION OF THIS INVENTION

The present invention provides an apparatus and a process for accomplishing the fracture separation, into a bearing cap and a connecting rod, of an integral preform, the latter being composed of powdered metal, cast iron, forged steel, aluminum or any other material suitable for use as a connecting rod. The process of this invention is conducted under ambient conditions and requires no prior embrittlement of the preform, as called for by earlier developments utilizing cryogenic chilling or electron beam hardening.

However, a stress-riser is required to control the location of fracture initiation (i.e. the location of the joint line). The stress-riser may be provided in a prior process by way of (a) V-notch broaching or other equivalent machining means, (b) laser etching, or (c) preforming a stress-riser in the "green" preform prior to firing (baking) and forging.

The present process utilizes a work-holding fixture which retains and locates the connecting rod preform with respect to its manufacturing datum features. The mechanism includes a dual slide ram coupled to a unilateral wedge interposed between a two-piece mandrel which, when activated, effects the fracture separation of the preform into a bearing cap and the connecting rod.

A further aspect of this process is the ability of the work-holding fixture to locate the pre-separated connecting rod preform on the manufacturing datum features, and to maintain this location throughout separation and re-mating. This goal is achieved by constructing the work-holding fixture on a precision slide. A lower portion of the work-holding fixture, which rigidly secures the connecting rod body, is affixed to the slide and restrains the connecting rod against any movement. The upper portion of the work-holding fixture, which locates and retains the bearing cap of the ultimate connecting rod, is affixed to a slide saddle movable on the precision slide.

This arrangement allows the beating cap to move independently of the connecting rod body during separation, while continuing to maintain its precision location with respect to the connecting rod body. The arrangement of the present invention further eliminates any tendency for the bearing cap to rotate during separation, thus promoting simultaneous fracture of both of the connecting rod legs. The re-mating of the separated beating cap to the connecting rod body is passively accomplished by spring loading the upper portion of the work-holding fixture to return it to its pre-fracture position. Subsequent to the fracture separation and re-mating of the bipartite connecting rod, the work-holding fixture, with its re-mated connecting rod still retained and located, can index out of the separation area for fastener insertion and further processing, as required.

More particularly, this invention provides an apparatus for the fracture separation, into a bearing cap and a connecting rod, of an integral preform which is configured to define a cylindrical aperture and two spaced-apart bolt seat shoulders, the apparatus comprising:

a base member, a guide member fixed with respect to said base member, the guide member defining a first guideway extending in a first direction, a first slide member mounted to said guide member for sliding movement along said first guideway in said first direction, the first slide member defining a second guideway also extending in said first direction, a second slide member mounted to said first slide member for sliding movement with respect to said first slide member along said second guideway in said first direction, a mandrel which is split to define an upper pan fixed with respect to the first slide member and a lower part fixed with respect to said base member, said upper part being movable between a first position in which it is spaced away from the lower pan and a second position in which it is juxtaposed against the lower part to define a substantially cylindrical body having its axis lying substantially in a second direction perpendicular to said first direction, movement of said upper part being simultaneous with movement of the first slide member along the first guideway with respect to said guide member, the upper and lower parts of said mandrel defining an internal tapered passageway, a wedge member adapted, when the upper part is in its second position, to enter said tapered passageway and force said mandrel pans apart, power means for moving said wedge member, projections defined by said second slide member and adapted to contact the bolt seat shoulders of an integral preform while the cylindrical aperture thereof receives the split mandrel, and means for selectively urging the second slide member toward the mandrel, thereby securely holding the integral preform in place, whereby the wedge member can enter the tapered passageway, forcing the mandrel parts apart and fracturing the preform into a bearing cap and a connecting rod.

Further, this invention provides a process for the fracture separation, into a bearing cap and a connecting rod, of an integral preform which is configured to define a cylindrical aperture and two spaced-apart bolt seat shoulders, the process comprising:

a) fitting the cylindrical aperture of the preform over a substantially cylindrical mandrel which includes separate upper and lower parts, b) holding the preform in place over the mandrel by pressing against the bolt seat shoulders in the direction toward the mandrel, and c) forcing the mandrel parts apart while holding the preform in place, thereby to fracture the preform into a bearing cap and a connecting rod.

BRIEF DESCRIPTION OF THE DRAWINGS

One embodiment of this invention is illustrated in the accompanying drawings, in which like numerals denote like parts throughout the several views, and in which.

DETAILED DESCRIPTION OF THE DRAWINGS

Figure 1:
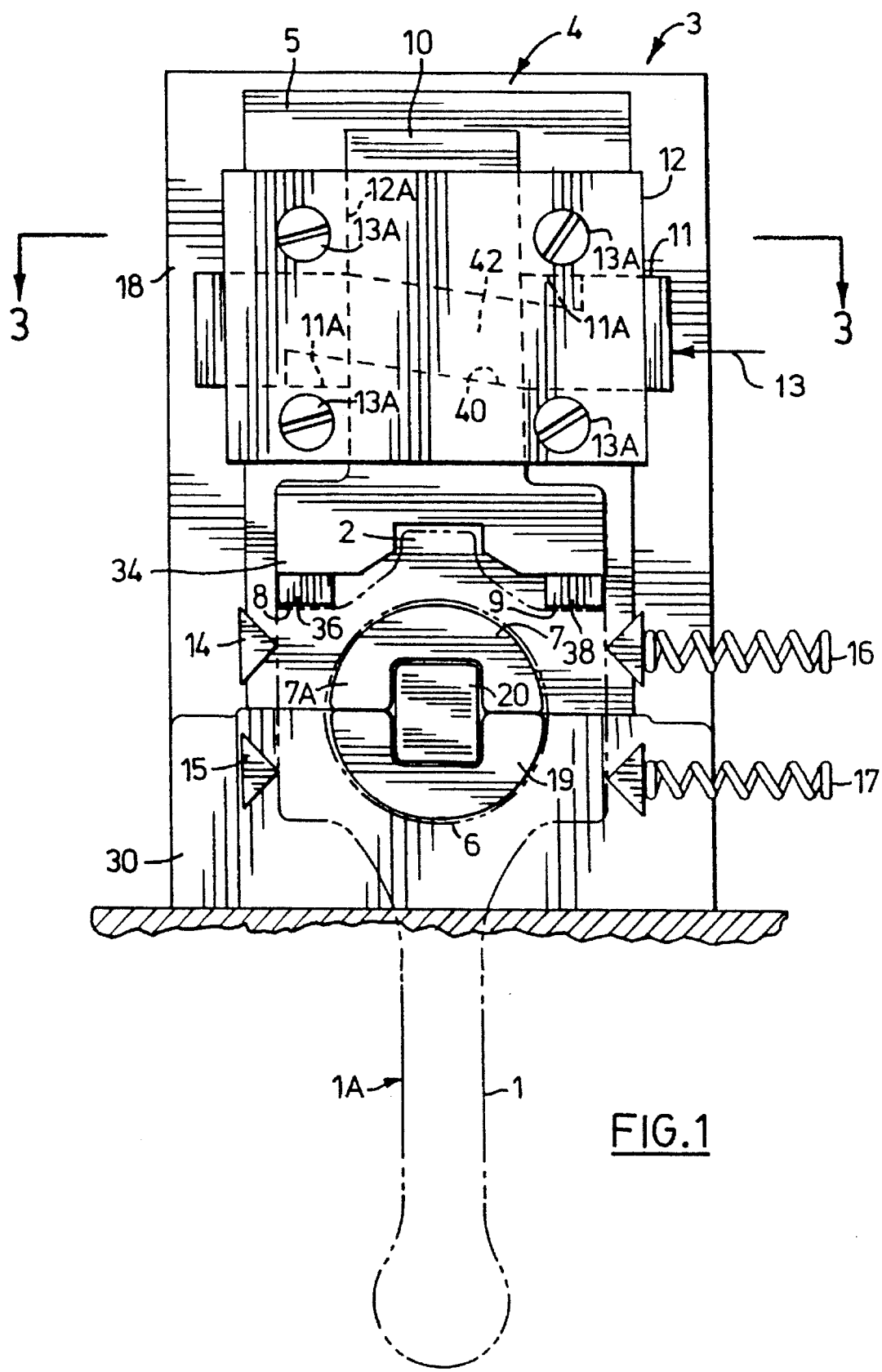
FIG. 1 is an elevational view looking at the front of the separation station in a direction perpendicular to the direction of transfer.

FIG. 1 illustrates, in broken lines, a pre-separated preform 1A integrally incorporating a connecting rod 1 and a bearing cap 2, located and secured in a separation station workholding fixture 3. It is to be noted that the preform 1A is configured to define a cylindrical aperture 6 and two spaced-apart bolt seat shoulders 8 and 9, this being the typical construction.

One of the key features of the fixture 3 is the attainment of a three-point, wedge-locked retention for the bearing cap 2, both before and after fracturing. This is accomplished through the use of a small slide assembly 4, which is best understood by comparing FIGS. 2 and 3.

A slide unit 21 is mounted for horizontal movement along the direction of the arrow 21A. Secured to the slide unit is a base member 30 which is integral with the lower part 19 of a split mandrel (the remainder of which will be described subsequently), and a guide member 18. Defined by the guide member 18 is a first guideway 18B which has two oppositely extending rectangular recesses 18A (see FIG. 3). The guideway 18B extends in a direction perpendicular to the arrow 21A.

A first slide member 5 is mounted to the guide member 18 for sliding movement along the first guideway 18B in the vertical direction (arrow 5A in the drawings), and itself contributes to defining a second guideway 5B, parallel with the direction of the first guideway. In FIG. 3, which is a horizontal section through the upper part of the assembly shown in FIG. 2, a second slide member 10 of rectangular section in its upper portion is trapped between the first slide member 5 and a slide assembly cover 12. In FIG. 3, the cover 12 defines a rectangular recess 12A and has lateral projections 12B for securely locating the cover 12 on the first slide member 5. As can also been seen in FIGS. 1 and 3, threaded fasteners 13A are utilized to secure the cover 12 against the first slide member 5.

Figure 2:
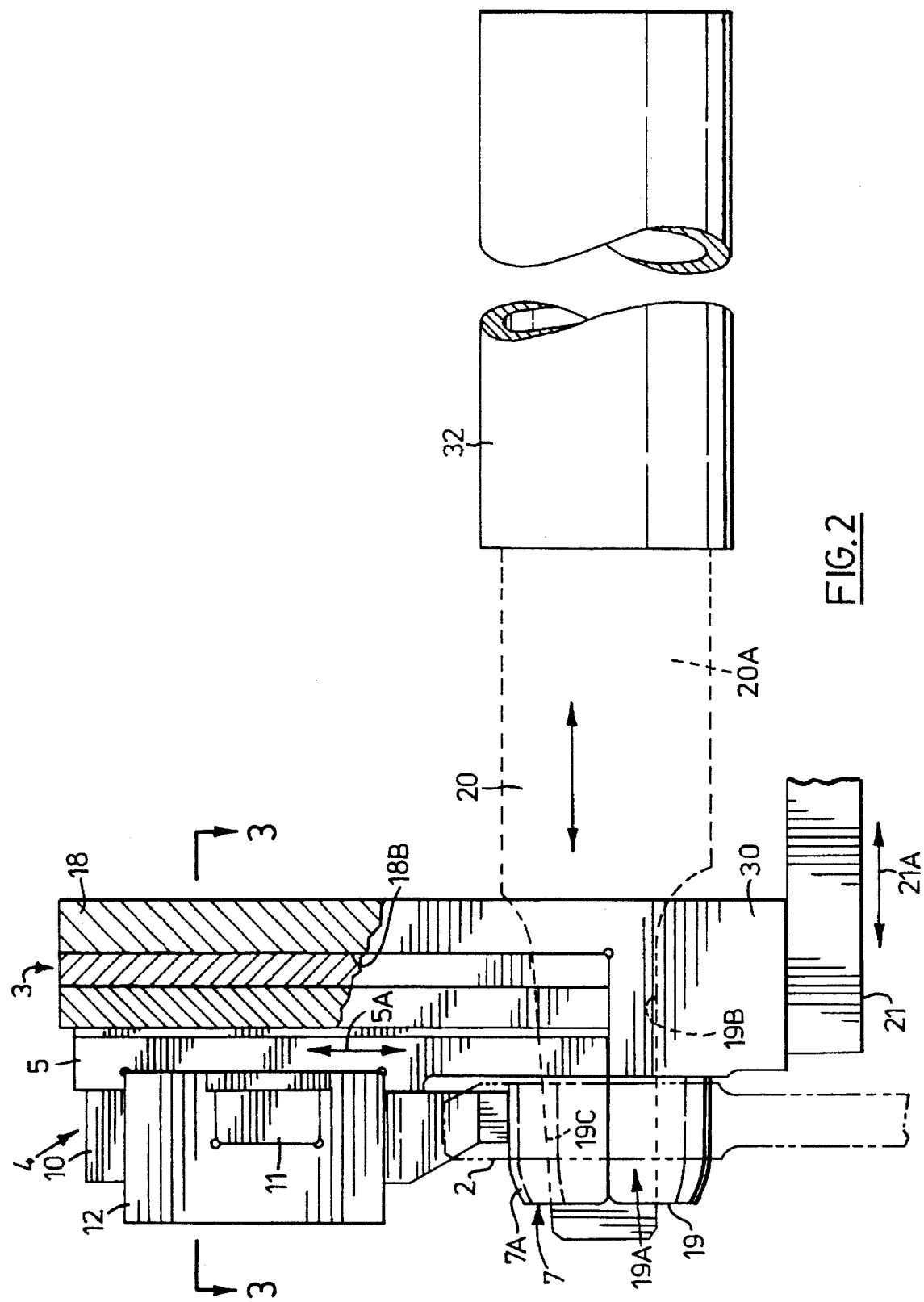
FIG. 2 is a side elevational view, looking at the separation station from a direction at right angles to the direction of FIG. 1, and is partly broken away to show a section along the line 2—2 in FIG. 3.
Figure 3:
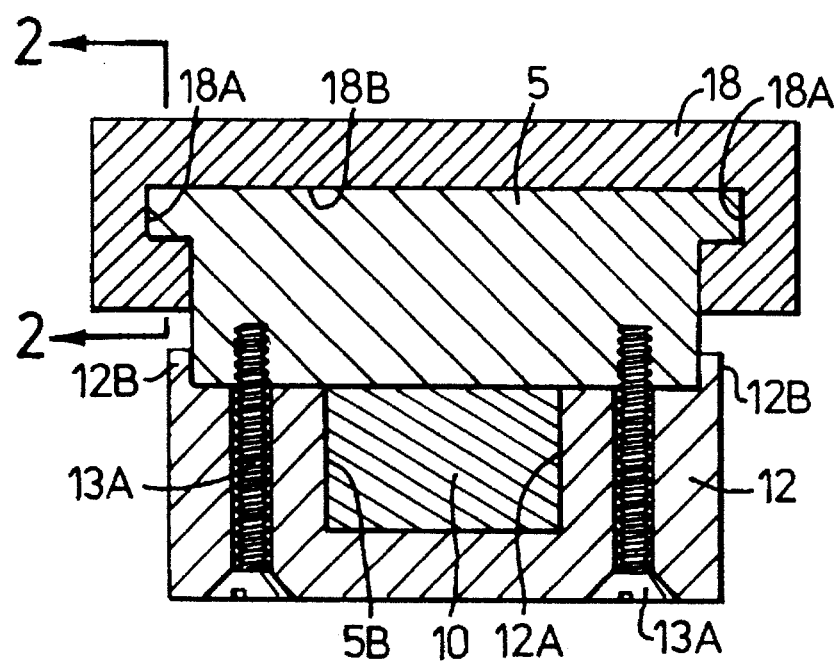
FIG. 3 is a horizontal sectional view taken at the line 3—3 in FIG. 2, and the line 3—3 in FIG. 1.

As illustrated in FIG. 2, the first slide member 5 integrally supports an upper part 7A of a split mandrel 7, from which it will be understood that, when the first slide member 5 moves upwardly with respect to the guide member 18, the upper part 7A of the split mandrel 7 moves upwardly away from the lower part 19. It will further be noted that the axis of the split mandrel 7 lies in a direction substantially parallel to the arrow 21A, and is thus substantially perpendicular to the first guideway 18B.

As further illustrated in FIG. 2, the upper and lower parts 7A and 19 of the mandrel 7 together define an internal tapered passageway shown in broken lines at 19A, the passageway 19A being such as to accept a wedge member 20 which, when driven to the left in FIG. 2, forces the mandrel parts 7A and 19 apart. It is to be noted that the passageway 19A has a substantially horizontal lower portion 19B and a sloping upper portion 19C, and that the leftward end of the wedge member 20 is correspondingly configured. The purpose for this configuration is to avoid downward force against the lower part 19, and to maximize upward force against the upper part 7A.

Power means for moving the wedge member 20 in FIG. 2 is illustrated schematically as a hydraulic or pneumatic cylinder 32. As an alternative, the wedge member 20 may be actuated by a slaved spring motion of known construction (not illustrated).

Figure 4:
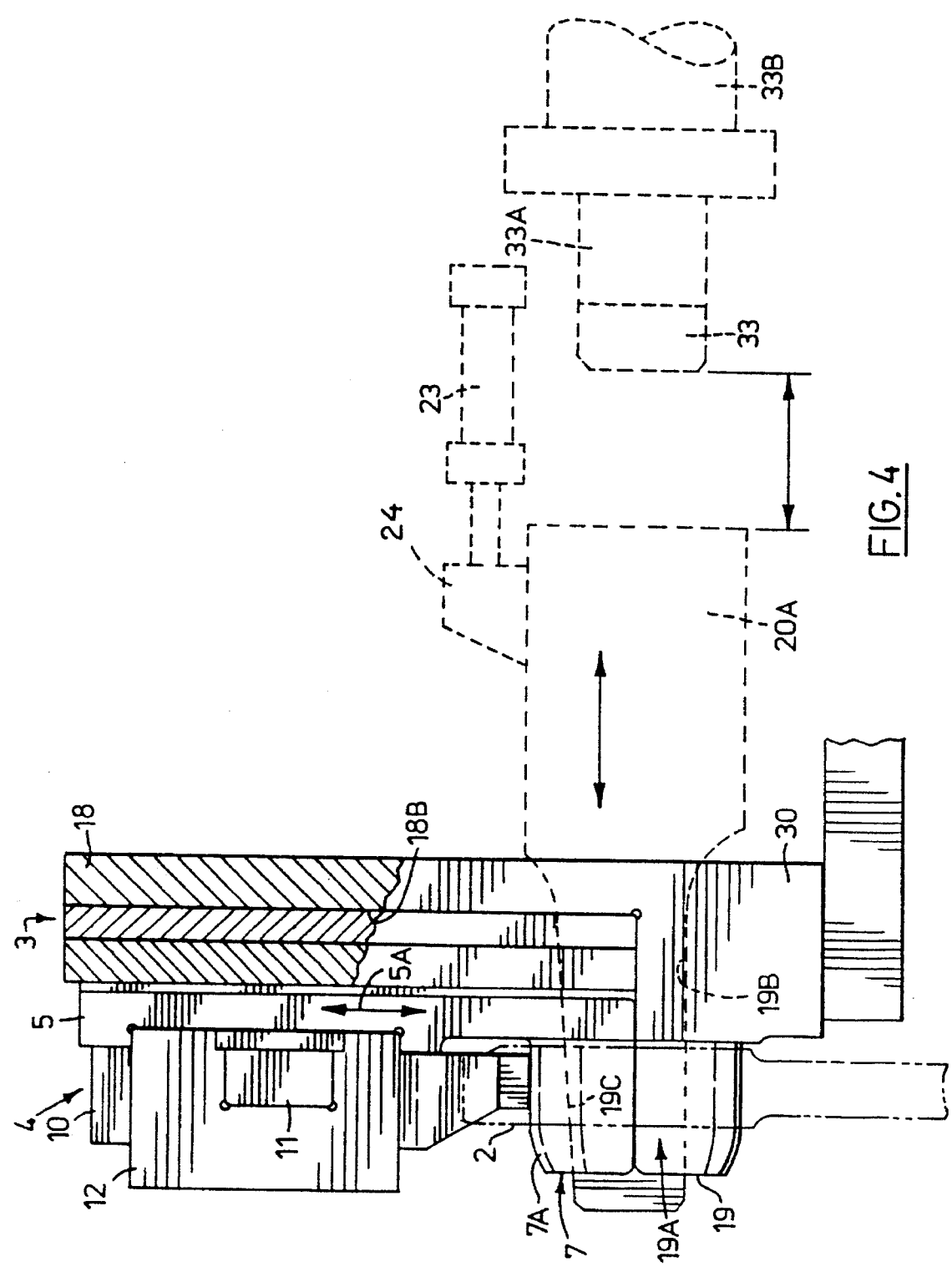
FIG. 4 is a view similar to that of FIG. 2, showing a variant of the element causing the fracture separation.

In an alternative construction, illustrated in broken lines in FIG. 4, a wedge 20A can first come into direct contact with the tapered passageway at a low force level, creating a pre-load upon the contact surfaces of the internal tapered passageway, whereupon a separate high-velocity ram 33 could impact upon the wedge 20A, thus causing separation of the preform into a cap and a rod. The pre-load by the wedge has the effect of taking up all slack, and leaving no free travel or lost motion in the upper and lower parts 7 and 19 defining the internal tapered passageway 19A. In FIG. 4, the ram 33 is the end of a piston 33A moving in a cylinder 33B. The position of the wedge 20A is controlled by an auxiliary cylinder 23 acting on a schematically illustrated flange 24 secured to the wedge 20A.

Referring now to FIGS. 1 and 2, the second slide member 10 has a widened portion 34 at the bottom, the portion 34 supporting projections 36 and 38 which are adapted to contact the bolt seat shoulders 8 and 9 while the cylindrical aperture 6 in the preform 1A receives the split mandrel 7.

Means are provided, utilizing a camming member 11, for selectively urging the second slide member 10 toward the mandrel 7, thereby securely holding the integral preform 1A in place. In FIG. 1, short hatch lines on portions 7A, 36 and 38 show the three-point "capture" of the upper part of the preform 1A.

It will now be understood that, when the wedge member 20 enters the tapered passageway 19A, it forces the mandrel part 7A upwardly away from the part 19, thereby fracturing the preform 1A into a bearing cap and a connecting rod.

The camming member 11 will now be described in greater detail. The cover 12 defines a horizontal, rectangular passage 11A to either side of the recess 12A. The camming member 11 is a Z-shaped cam adapted to be moved by a force along the arrow 13. The upper part of the second slide member 10 is machined to define a sloping passageway 40 for receiving a central part 42 of the cam, having the same slope as the passageway 40. It will be understood that, as the camming member 11 moves leftwardly (as seen in FIG. 1), the second slide member 10 will move downwardly.

Illustrated schematically in FIG. 1 are locate and retention locators 14–17. The locators 14 and 15 are fixed or static, whereas the retainers 16 and 17 are dynamic clamps that apply a constant force leftwardly on the preform, seating it firmly against the locators 14 and 15.

More particularly, the locators 14–17 include a first static locator 14 adapted to contact one side of the portion of the preform 1A which is intended to become the bearing cap, and a second static locator adapted to contact one side of the portion of the preform 1A intended to become the connecting rod. On the right in FIG. 1, the dynamic locator 16 is adapted to contact the other side of the portion of the preform 1A which is intended to become the bearing cap, while the second dynamic locator 17 is adapted to contact the other side of the portion of the preform 1A which is intended to become the connecting rod. The dynamic locators 16 and 17 can be urged leftwardly by the use of resilient means, such as springs. The locators 14 and 16 are mounted on the first slide member 5 while the locators 15 and 17 are mounted on the base member 30. It will thus be seen that, even though the fixture 3 constitutes a part carrier that is used for transferring the connecting rod from one machine station to another, the locators remain engaged with the preform (the connecting rod components) throughout the fracture and separation cycle.

Utilization of the illustrated apparatus may be defined as a process for the fracture separation, into a bearing cap and the connecting rod, of an integral preform configured to define a cylindrical aperture and two spaced-apart bolt seat shoulders. The process involves first fitting the cylindrical aperture of the preform 1A over the substantially cylindrical mandrel 7 that includes separate upper and lower parts 7A and 19 respectively, then holding the preform 1A in place on the mandrel 7 by causing the projections 36 and 38 to press downwardly against the bolt seat shoulders 8 and 9 respectively in the direction toward the mandrel then forcing the parts 7A and 19 apart (while holding the preform 1A in place) thereby fracturing the preform 1A into a bearing cap 2 and a connecting rod 1. Upon fracture, caused by the high-velocity of the wedge member 20 entering between the mandrel halves 7A and 19, the following portions move vertically upward: the first slide member 5 with its integral part 7A of the split mandrel 7; the cover 12, the second slide member 10, the cam member 42, the locators 14 and 16, and the bearing cap 2 (which has been split from the connecting rod 1). The following parts remain stationary: the lower part 19 of the expanding mandrel 7, the guide member 18, the base member 30 and the slide unit 21.

Immediately upon completion of fracture separation, the wedge member 20 is withdrawn from between the mandrel halves 7A and 19, allowing the first slide member 5 to return to its pre-separation position. Actuation to return the first slide member 5 downwardly can employ any linear force device (springs, cylinders, etc.), or gravitation.

It will now be understood that the apparatus and process described above allow the bearing cap 2 to be fracture-separated from the connecting rod body 1, while all throughout the separation and re-mating process the location uniqueness of the bearing cap 2 with respect to the connecting rod body 1 is maintained.

With respect to the slide unit 21 seen in FIG. 2, its purpose is 1) to bring the equipment required to separate and re-mate the connecting rod bipartite while it is located and retained in the fixture part 3 or part carrier, and 2) to perform separation and remating, and then withdraw from the connecting rod bipartite, leaving it located and retained as it was prior to separation.

While this invention has been described and illustrated with the connecting rod preform 1A in a vertical attitude, the particular part attitude is not a limitation of this invention. The process outlined above can be carried out with the connecting rod in any desired attitude. Of course, the various slides, actuators, clamps, locators and directions of motion, as previously described, would change their attitudes in a similar way, in order to keep the relative motions and directions consistent.

A detailed description of the process follows:

Firstly, the locators 14–17 are activated to grip the preform.

Secondly, with the second slide member 10 withdrawn upwardly such that the projections 36 and 38 do not interfere, the preform aperture 6 is engaged with the split mandrel 7 and the ram slide assembly by a linear motion, with the split mandrel pans 7A and 19 being juxtaposed against each other.

Next, the three-point retention of the connecting rod bearing cap is activated, this taking place between the cap half 7A of the split mandrel 7 and the projections 36 and 38, which contact the bolt seat shoulders.

Then, the wedge member 20 or the wedge 20A is activated to split the mandrel 7, following which the wedge member 20 or wedge 20A is withdrawn.

Then, the bearing cap retention constituted by the projections 36 and 38 is disengaged.

Then, the split mandrel and the ram slide assembly is disengaged from the connecting rod by moving the slide unit 21 (illustrated in FIG. 2).

Finally, the locators 14–17 are disengaged at the point of removal of the 2-piece preform which has been reassembled using two bolts.

While one embodiment of this invention has been illustrated in the accompanying drawings and described hereinabove, it will be evident to those skilled in the art that changes and modifications may be made therein without departing from the essence of this invention, as set forth in the appended claims.

The embodiments of the invention in which an exclusive property or privilege is claimed are defined as follows:

1. An apparatus for the fracture separation, into a bearing cap and a connecting rod, of an integral preform which is configured to define a cylindrical aperture and two spaced-apart bolt seat shoulders, the apparatus comprising:

a base member, a guide member fixed with respect to said base member, the guide member defining a first guideway extending in a first direction, a first slide member mounted to said guide member for sliding movement along said first guideway in said first direction, the first slide member defining a second guideway also extending in said first direction, a second slide member mounted to said first slide member for sliding movement with respect to said first slide member along said second guideway in said first direction, a mandrel which is split to define a cap part fixed with respect to the first slide member and a body part fixed with respect to said base member, said cap part being movable between a first position in which it is spaced away from the body part and a second position in which it is juxtaposed against the body part to define a substantially cylindrical body having its axis lying substantially in a second direction perpendicular to said first direction, movement of said cap part being simultaneous with movement of the first slide member along the first guideway with respect to said guide member, the cap and body parts of said mandrel defining an internal tapered passageway, said base member being mounted for movement substantially in said second direction, a wedge member adapted, when the upper part is in its second position, to enter said tapered passageway and force said mandrel parts apart, power means for moving said wedge member, projections defined by said second slide member and adapted to contact the bolt seat shoulders of an integral preform while the cylindrical aperture thereof receives the split mandrel, and means for selectively urging the second slide member toward the mandrel, thereby securely holding the integral preform in place, movement of the wedge member through the tapered passageway, forcing the mandrel parts apart and fracturing the preform into a bearing cap and a connecting rod.

2. The apparatus as claimed in claim 1 wherein said means for selectively urging the second slide member towards the mandrel comprises a cam means, the apparatus further including actuating means for said cam means.

3. The apparatus as claimed in claim 1 further comprising:

a first static locator means mounted on said first slide member and adapted to contact one side of the portion of said preform intended to become the bearing cap, a second static locator means mounted on said first slide member and adapted to contact one side of the portion of said preform intended to become the connecting rod, a first dynamic locator means mounted on said first slide member and adapted to contact the other side of the portion of said preform intended to become the bearing cap, a second dynamic locator means mounted on said first slide member and adapted to contact the other side of the portion of said preform intended to become the connecting rod, and resilient means for urging the dynamic locator means toward the respective static locator means.

* * * * *

UNITED STATES PATENT AND TRADEMARK OFFICE
CERTIFICATE OF CORRECTION

PATENT NO. : 5,503,317
DATED : April 2, 1996
INVENTOR(S) : JONES et al.

It is certified that error appears in the above-identified patent and that said Letters Patent is hereby corrected as shown below:

Column 1, line 14, delete "era" insert --make--.

Column 2, lines 8 and 14, delete "beating" insert --bearing--.

Column 2, line 40, delete "pan" and insert --part--.

Column 2, line 44, delete "pan" and insert --part--.

Column 2, line 55, delete "pans" and insert --parts--.

Column 4, line 5, delete "pan" insert --part--.

Column 6, line 21, delete "pans" insert --parts--.

Column 7, line 12, delete "upper" insert --cap--.

Signed and Sealed this

Third Day of September, 1996

Attest:

BRUCE LEHMAN

Attesting Officer     Commissioner of Patents and Trademarks